Sept. 13, 1927.                                                          1,642,379
E. A. MOLLNOW
BOLT NUTTING AND AUTOMATIC CHUCKING APPARATUS AND METHOD
Filed Feb. 9, 1926                                     4 Sheets-Sheet 1

Inventor
Edward A. Mollnow
By his Attorney
George C. Neau

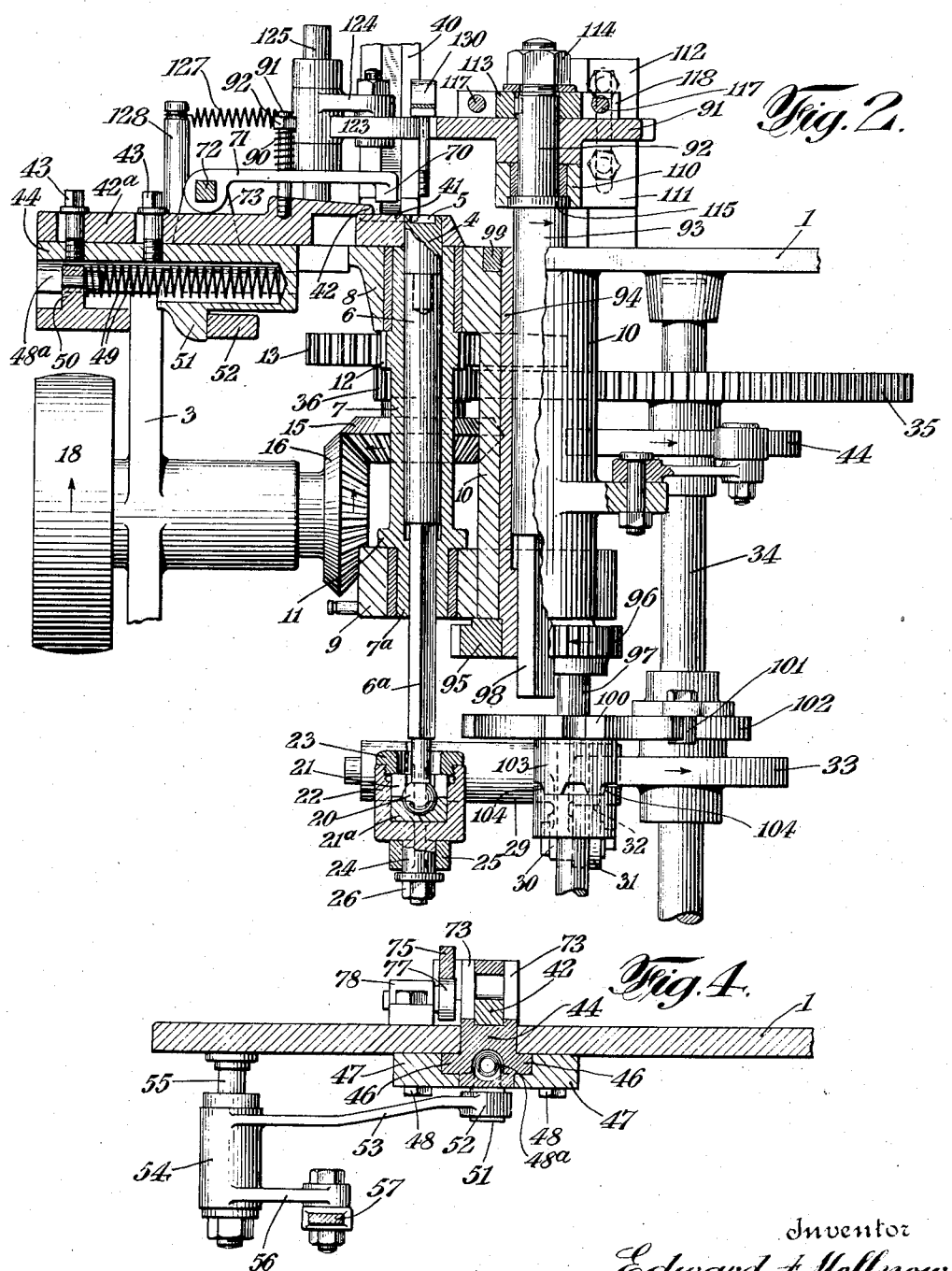

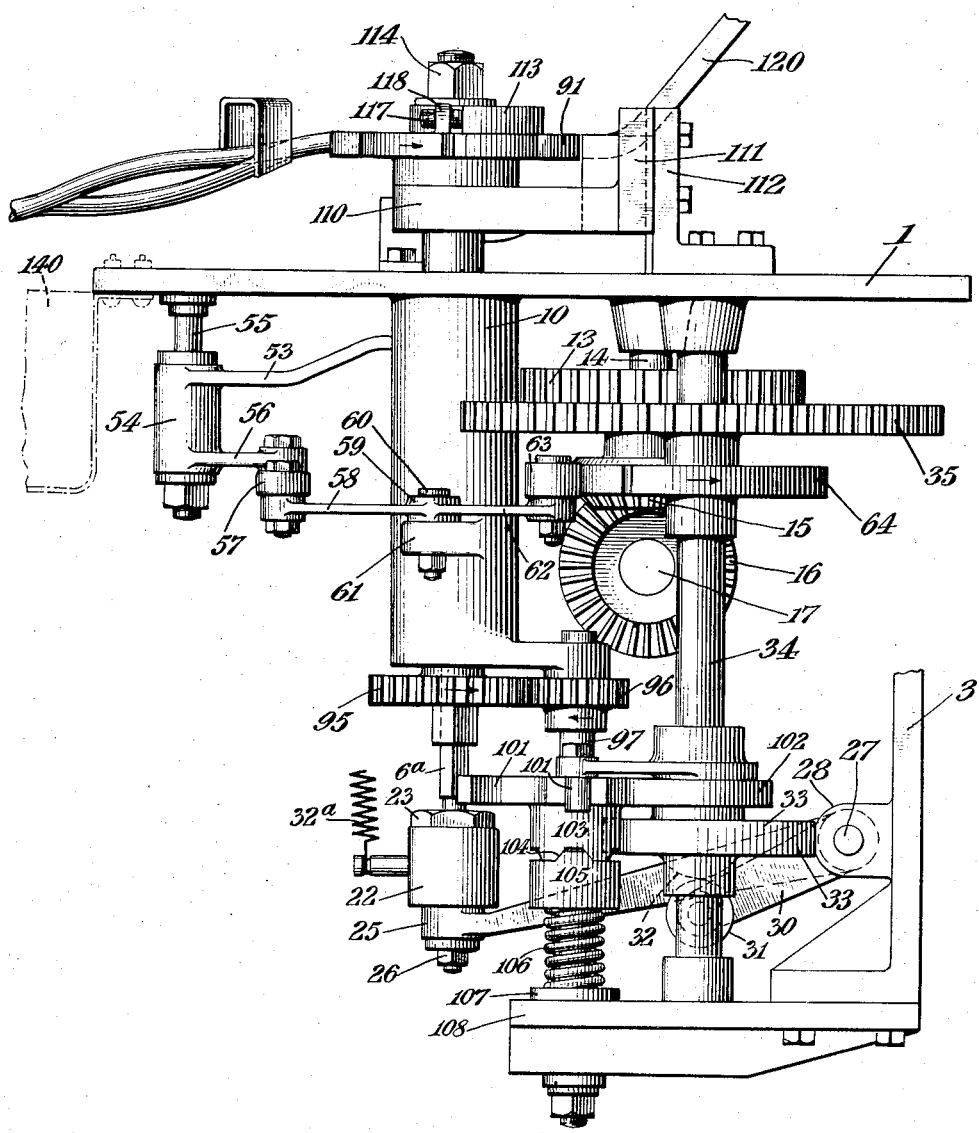

Sept. 13, 1927.  
E. A. MOLLNOW  
1,642,379  
BOLT NUTTING AND AUTOMATIC CHUCKING APPARATUS AND METHOD  
Filed Feb. 9, 1926  
4 Sheets-Sheet 4

Inventor  
Edward A. Mollnow  
By his Attorney

Patented Sept. 13, 1927.

1,642,379

UNITED STATES PATENT OFFICE.

EDWARD A. MOLLNOW, OF NORTH TONAWANDA, NEW YORK, ASSIGNOR TO BUFFALO BOLT COMPANY, OF NORTH TONAWANDA, NEW YORK, A CORPORATION OF NEW YORK.

BOLT NUTTING AND AUTOMATIC CHUCKING APPARATUS AND METHOD.

Application filed February 9, 1926. Serial No. 87,002.

My present improvements are shown as embodied in a nutter for bolts, that is, a machine for automatically assembling mating bolts and nuts by screwing the nut onto the bolt, but certain features of the invention may be found useful in other connections, as will be obvious from novel features hereinafter referred to.

The machine comprises a novel nut chuck in which nuts can be placed and automatically centered while the chuck is rotating at high speed, the centering being accomplished merely by mechanical reactions of the nut with respect to a socket having no movable jaws; also novel mechanism for placing the nuts in the chuck while it is thus rotating at high speed; also means for holding and presenting successively the threaded ends of bolts in operative relation with and centered with respect to the nut and the chuck, preferably in the form of an indexing turret; also mechanism whereby operation of all of the above parts are synchronized for continuous operation at high speed.

In the preferred form, there is a gravity operating guideway feeding the nuts to the placer and another gravity operated guideway feeding the bolts to the holding and presenting mechanism and the latter is preferably an indexing turret operatively related to a novel stripper mechanism whereby the bolts from the nutting mechanism are automatically stripped from the turret and properly nutted bolts are automatically separated from bolts that have failed to take the nuts.

While the nuts and bolts may be fed by hand into their respective holding mechanism or into the guides leading thereto, it is usually preferable to use the guides with well known forms of automatic mechanism whereby the nuts in bulk in one hopper and the bolts in bulk in another hopper are automatically supplied to the guides.

The above and other features of my invention may be more fully understood from the following description in connection with the accompanying drawings, in which Fig. 1 is a plan view of the machine;

Fig. 2 is a section in the plane of the axes of the nut chuck and the bolt holder, on the line $a$—$a$, Fig. 1, looking in the direction of the arrows;

Fig. 3 is an elevation endwise of the line $a$—$a$, Fig. 1, viewed from the right end of said line;

Fig. 4 is a detail section through the nut placing mechanism, on the line $b$—$b$, Fig. 1;

Figure 5:
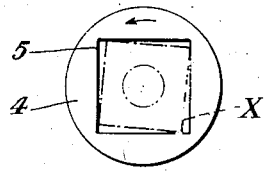
Fig. 5 is a detail plan view of a chuck, the outline of a nut thereto being indicated in dotted lines.
Figure 6:
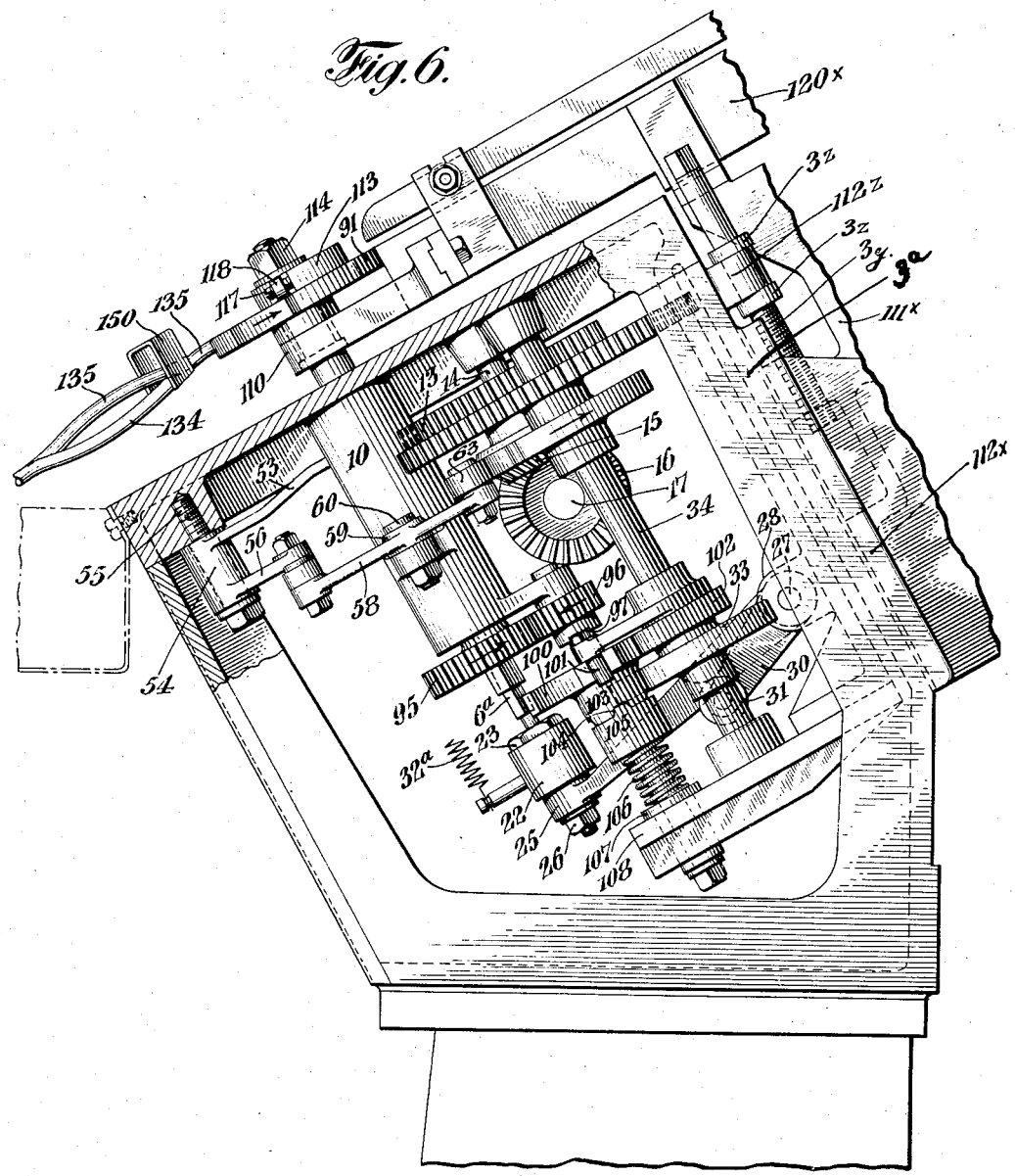
Fig. 6 is like Fig. 3, but showing the machine mounted in the preferred inclined position.

The machine is shown as including a table or bed, 1, mounted on suitable supports, as 3, 3, and may be horizontal as indicated in Figs. 1 to 5 but is preferably inclined as in Fig. 6. The nut and bolt-engaging parts of the machine are above the table and are driven by mechanism located below the table, most of the important operating parts being better shown in Fig. 2 than in any other single figure. The nut chuck, 4, has on the upper end thereof a socket, 5, which, as shown in Fig. 5, has a shape corresponding to the periphery of the nut, $x$, which in this case is square, but the socket is substantially larger than the nut, the difference in dimensions being dependent somewhat upon whether the nut is square or hexagonal and somewhat upon the speed at which the chuck is designed to rotate while the nut is being fed over and down into said recess. Where the nut was square and the chuck continuously rotating at, say, 900 to 1500 revolutions per minute, it was found that a socket $\frac{7}{16}$ of an inch square operated satisfactorily for the reception and automatic centering of nuts $\frac{3}{8}$ of an inch square, the ratio being thus 7 for the socket as against 6 for the nut. In this particular case, it was found that the automatic placing and centering of the nut was satisfactorily performed with the chuck rotating at 1725 revolutions per minute.

The other feature, which is quite independent of ease of insertion of the nut, is the automatic centering that results the instant the non-rotating nut becomes fairly engaged within the socket. The nut, by reason of its own inertia, and also by friction due to down pressure of the placing means, resists rotation with a force sufficient to instantly take up all play of the nut in the socket, and the corners of the nut are automatically cammed by the inner walls of the socket into the exact centered position shown in Fig. 5. Even if displaced from this position by withdrawal of the placer, the retarding effect of contact with the end of a bolt will repeat this corner camming and centering operation. Moreover, such centering being non-positive, the nut may shift center to such slight extent as may be necessary to accommodate slight eccentricity of the axis of the bolt with respect to the axis of the chuck. Furthermore, as the nut screws onto the stationary bolt, it can screw itself out of the socket even though the axis of the bolt be inclined somewhat with respect to the axis of the socket.

It will be evident from Fig. 5, that in the above operation only certain limited portions of the walls of the socket have any function so far as concerns the automatic holding, centering and rotating of the nut; consequently, it is the location and shape of these functioning portions of the walls of the sockets that are important. For instance, it is not at all necessary that the socket, 5, Fig. 5, be square provided it has the bearing, centering and rotating surfaces required for the corners of the square nut, $x$.

The socket recess, 5, is located on and rotated by vertical shaft, 6, the end portion, 4, containing the socket, being preferably detachably secured as shown in Fig. 2, so that different sizes and shapes of socket may be employed for corresponding sizes and shapes of nut. As it is preferred that the nut chuck reciprocate to apply the nut to the bolt rather than vice versa, it is slidably mounted on a sleeve, 7, which is journaled in a boss, 8, depending below the table, and in a bracket, 9, carried by a support, 10, the sleeve being formed with a collar, 11, engaging the top of the latter bracket to serve as a thrust-bearing supporting weight of the sleeve. This sleeve is driven by pinion, 12, engaging gear, 13, mounted on vertical shaft, 14, having a miter gear, 15, driven by a mating gear, 16, on main drive shaft, 17, on the other end of which is a pulley, 18, which may be connected by belt with a suitable source of power. The chuck shaft, 6, has a reduced portion, $6^a$, which is polygonal, preferably hexagonal, and slides in a correspondingly shaped lower portion, $7^a$, of sleeve, 7, thus affording a spline connection whereby shaft, 6, rotates with sleeve, 7, but is longitudinally reciprocable therein.

The support for shaft, 6, is through a ball, 20, stepped in socket bearing the two halves, 21, $21^a$ of which are held in an exterior socket, 22, by clamping ring, 23. Socket, 22, has a depending portion, 24, extending through the end of a lever, 25, and secured by nut, 26 (see Figs. 2 and 3). The lever, 25, is pivoted on shaft, 27, in bearing, 28, carried by frame member, 3, Fig. 3. Lever 25 is integral with sleeve 29 and, through it, with lever 30, having at the outer end anti-friction roller, 31, adapted to be depressed by cam projection, 32, on the face of disc, 33, mounted on shaft, 34, which is rotated by gear, 35, driven by pinion, 36 on the above described shaft 14 above described as rotating the nut chuck through gear, 13.

Roller 31 is continuously pressed upwardly into contact with cam projection, 32, and the plane lower face of rotor, 33, preferably by a spring, as by spring, $32^a$, tensioning the end of lever 25 upward, the other end of the spring being anchored at any suitable point on the frame of the machine. A thrust spring under either lever, 25, or lever, 30, would serve the same purpose. In the position shown in Fig. 3, roller, 31, is resting on the tip of cam, 32, and the wrench socket, 5, is therefore in its normal lowermost position; but as the cam rotates, the roller, 31, being free, permits the spring, $32^a$, to yieldingly force the socket, 5, upward for engaging it with the thread of a bolt and for following it up a predetermined distance until the roller comes in contact with the plane face of 33 which thus fixed the upper limit of such movement.

Automatic means for depositing nuts in the socket, 5, when held in the lowermost position by the cam 32, is shown as comprising a chute, 40, in which a train of nuts is maintained and normally fed downward by gravity onto the upper surface of a nut receiving table, 41, supported by table, 1, and having a vertical opening through which reciprocates the chuck member, 4. As shown in Fig. 2, a pusher member, 42, is located on the front end of a plate, $42^a$, adjustably secured by bolts, 43, to slide carriage, 44, (see Fig. 4), having a portion projecting above the table through a slot and formed beneath the table with laterally projecting portions, 46, 46, engaging the under side of the table and held in position by guides, 47, 47, secured to the under side of the table by bolts, 48, 48. The underside of the slide member, 44, 46, is hollowed out as shown at $48^a$, Fig. 2, and a spring, 49, normally presses the carriage forward, the rear end of the spring being anchored on a stationary lug, 50, affording a thrust abutment therefor. The slide is positively retracted through a lug, 51, depending from the lower side thereof, the forward face of said lug being engaged by a head, 52, on the end of a lever, 53, integral with sleeve, 54, rotatably mounted on shaft, 55, depending from table, 1, the sleeve, 54, being also integral with lever, 56, operated through pivotally connected thrust link, 57, operated by lever arm, 58, integral with hub, 59, mounted on pivotal shaft, 60, carried by bearing bracket, 61, on the exterior of the bearing 10, which supports the clutch rotating sleeve. Lever arm, 58, is operated by arm, 62, integral with hub, 59, and carrying at the free end thereof an anti-friction roller, 63, engaging the periphery of cam, 64, on the upper end of shaft, 34, which is the shaft above described as carrying cam, 32, 33, which controls endwise movement of the nut clutch spindle. As shown in dotted lines, Fig. 1, cam, 64, has most of its periphery cylindrical, the remainder of the periphery being devoted to a cam projection, 65, affording quick retraction and slow release of the pusher carriage. By the above construction, pressure of the nut toward the chuck, 4, is non-positively applied by the spring, 49, so that jamming and breakage of parts is impossible.

The nut is held down on table, 41, in front of pusher, 42, by presser foot, 70, carried by arm, 71, carried by rock-shaft, 72, pivotally mounted in brackets, 73, which are integral with slide, 44. Movements of rock-shaft, 72, are controlled by an arm, 75, rigid with said shaft, 72, and having its free end, 76 adapted to engage with and be lifted by stationary roller, 77, which is mounted in bracket, 78, on the top of table, 1. In the position shown in Figs. 1 and 2, this holds the presser foot, 70, in the elevated position permitting a nut to slide in laterally from guideway, 40, in front of the pusher, 42, but as soon as lever, 52, retreats, permitting carriage, 44, to be urged forward by spring, 49, 76 rides off of roller, 77, permitting the presser foot to clamp the nut under the influence of spring, 90, held on bolt, 91, by nut, 92. This spring keeps the presser, 70, adjustably bearing on the nut until it "takes" in socket, 5.

While the bolts may be presented to the nuts in the chuck by hand or with the assistance of a stationary guide, I prefer automatic mechanism comprising a turret holder, consisting of a disc, 91, having peripheral V-notches, 91ª, 91ᵇ, 91ᶜ, 91ᵈ, etc., for receiving the bolts. As shown in Figs. 2 and 3, this disc is mounted on a shaft, 92, which is made endwise adjustable as well as rotatable by means which may be similar to that employed for the chuck spindle, 6. That is to say, it has a cylindrical portion, 93, slidable in a sleeve, 94, mounted in bearing, 10, depending from table, 1, the sleeve, 94, having at its lower end a gear, 95, meshing with gear, 96, on shaft, 97. Said turret carrying shaft, 93, has a reduced hexagonal extension, 98, affording splined engagement with the lower end of said sleeve, 94. Vertical support for said sleeve is afforded by collar, 99, on the upper end thereof, engaging a suitable recess in table, 1. Rotation of the sleeve through its gear, 95, by the gear, 96, on shaft, 97, is effected by means of a Geneva stop mechanism, of which the slot wheel member, 100, is mounted on said shaft, 97. The indexing stud, 101, for rotating said wheel, with its cooperating cylindrical lock member, 102, is mounted on and rotated by shaft, 34, above described as carrying the spindle reciprocating cam, 33, and the nut feed cam, 44. The driven slot wheel, 100, of the Geneva stop, drives the shaft, 97, through its hub, 103, which has two pairs of notches, 104, engaging a pair of corresponding diametrically opposite projections on collar, 105. Collar 105 is splined on said shaft, 97, and is yieldingly held with its pair of projections normally engaged in driving relation to 103 by means of spring, 106, which encircles shaft, 97 and abuts against a collar, 107, resting on a bracket, 108, which also affords a rotary thrust bearing for said shaft, 97, as well as shaft, 34. With this construction, jamming of bolts such as would lock the carrier disc, 91, against rotation would not result in breakage of the parts, because the positively driven Geneva stop would execute its indexing movement, the collar 105 being depressed against the pressure of spring, 106, and projections 104 camming downward, thus permitting shaft, 97, and the connecting mechanism to remain idle until the jam can be cleared or the machine stopped. Such release and slip will leave the bolt carrier, 1, in a proper registering position, because the four notches in 103 register with the slots of the Geneva slot disc, 100.

As shown in Fig. 2, the carrier, 91, is not keyed to the shaft, but rests on the top of a bearing, 110, projecting from a carriage, 111, vertically adjustable in standard, 112. The shaft, 92, is engaged with this same bearing, 110, so as to follow vertical adjustment thereof by the carrier disc, 91, which itself is held down by disc, 113, keyed to the shaft, 92 and clamped by nut, 114, on the end of shaft, 92. Preferably, the shaft, 92, has a collar, 115, to prevent endwise displacement of the shaft with respect to the carrier bearing, 110.

The turret disc, 91, is adjustably locked in desired angular relation to the keyed member, 113, by means of screws, 117, in ears, 118, integral with disc, 91, and having their free ends bearing tightly against the co-operating surfaces, on member 113. These screws are used for adjusting the bolt holding notches, 91ª, 91ᵇ, etc., for exact registry with the bolt supplying guideway, 120, and the nut chuck spindle, 6.

A train of bolts hanging by the heads, with their shanks depending between the guides are forced downward by gravity into contact with the periphery of the turret, 91, being held back by the smooth cylindrical portions thereof, but automatically advancing into the notches, 91ª, whenever the latter come in registry with the outlet of the slot. The guide on the advancing side of the notch is supplied with a pivoted latch section, 121, adapted to yieldingly wipe the bolt into full engagement with the notch but yielding to permit ejection of the bolt in case it is improperly seated. Closely surrounding the periphery of the carrier is a concentric guide member, 122, rigidly secured to the side face of guideway, 120ª, and extending around to a point adjacent the nut holding chuck. At this point, the guiding and holding function is performed by an anti-friction roller, 123, carried by a lever, 124, pivoted on shaft, 125, and having a rearwardly extending arm, 126, connected to a tension spring, 127, anchored at 128 and yieldingly forcing the anti-friction roller against the bolts held in the notch 91ᶜ, which is in registry with the nutting spindle. The bolts are held against the upward thrust of the nut by means of spring, 130, under which the bolts are carried, the free end of the spring being bent downward so as to bear strongly on the heads while in the nutting position.

On the exit side of the nutter there is an additional concentric holding guide, 131, extending to the discharge point of the bolt. This guide is supported on stud, 132, being locked to the same by set screws, 133. This guide becomes tangential at the position shown for notch, 91ᵈ, where is located the exit guide member, 134, on one side and the stripper guide member, 135, on the other side, adapted to engage the shanks of the bolts just below the heads thereof. The indexing movement strips the bolt tangentially from the notch, 91ᵈ, forcing a train of the bolts along suspended by their heads. These guides are twisted through a 180° helical curve, thereby turning the bolts upside down while still guiding them. When so turned, a properly nutted bolt, as $x'$, will continue in the train suspended by its nut instead of by its head, as indicated at $x^2$, but an unnutted bolt, as $y$, will fall out, and a receptacle to receive such bolts is diagrammatically indicated at 140, Fig. 3. The properly nutted bolts continue on to the end of the guideway where they are received in a separate receptacle. The proper spacing of the guides may be maintained by rigidly secured bridge members, 150, 150.

Figure 1:
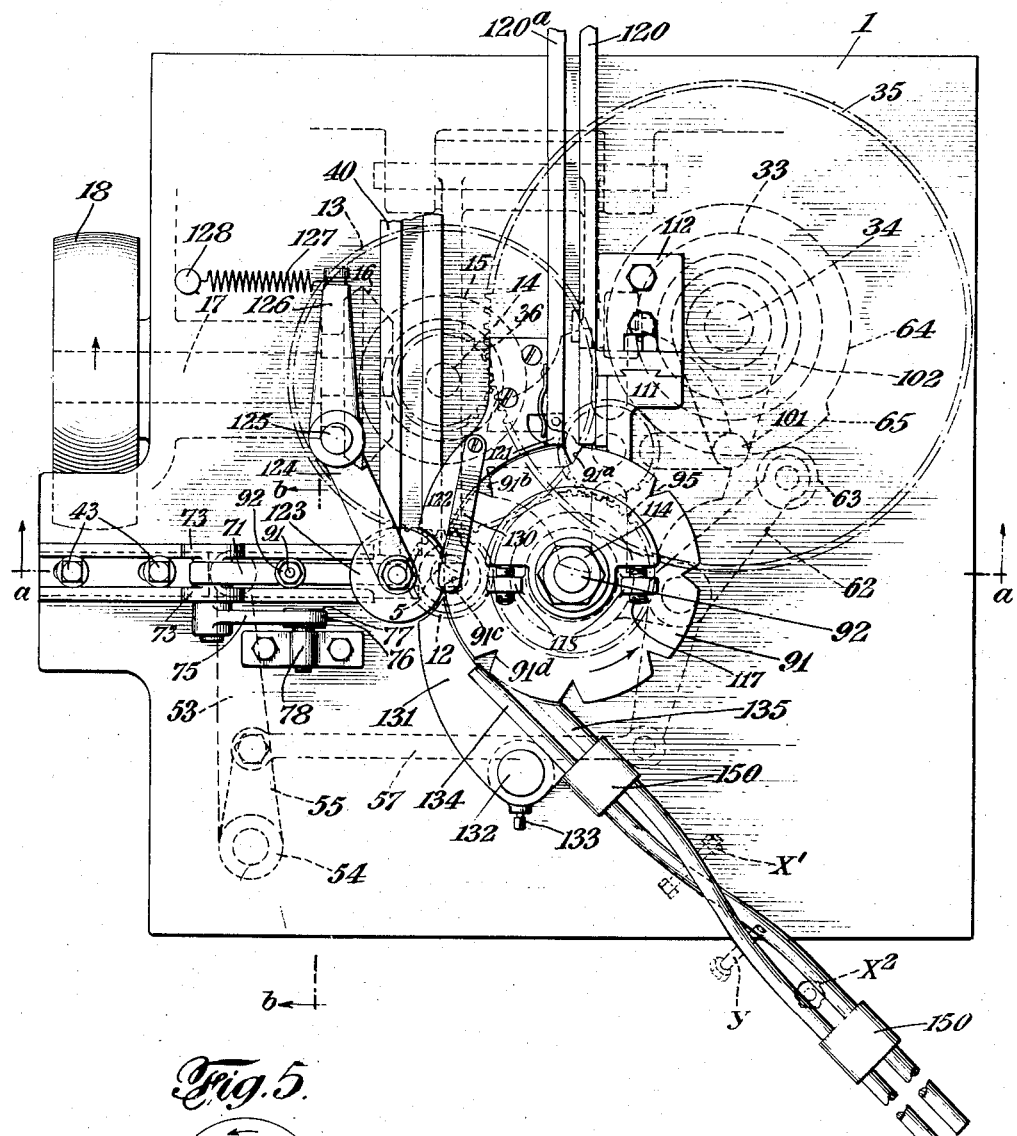

The preferred operation and timing of the apparatus will be obvious from the above. A train of nuts is maintained in guide, 40, and a train of bolts hang by their heads in guide 120, supplied either by hand or from automatic hopper feeds, not shown. The belt is driving the pulley, 18, in a direction to rotate shaft, 14, clockwise, thereby rotating the nut spindle, 6, and the timing shaft, 34, anti-clockwise. The latter rotation through the Geneva stop and gear, 96, causes the indexing of the turret to be also anti-clockwise. Correct directions of motion being thus traced, the timing is as follows: In Figs. 1 and 2, the Geneva stop has just completed an indexing movement which required a quarter turn of shaft 34. At this instant it will be noted that the nut placer is being held in a retracted position by cam, 65, that it was very suddenly retracted by the cam shoulder during the last third of the indexing quarter rotation, and that the placer is being slowly released for spring pressure forward into contact with the side of the spindle by the time it will be lifted by release of roller, 31, from depressing projection, 32, on cam wheel, 33; also that said projection, 32, had retracted the nut spindle and permitted the placer to snap over it during the indexing movement and that it was almost immediately retracted by the above described abrupt shoulder of cam 65. Thus, the nut was placed and the placer retracted just before the bolt reached the operative indexed position, 91ᶜ.

The Geneva stop operating through a quadrant of the rotation of timing shaft, 34, operates through the two to one reducing gears, 96, 95, to index the turret only one-eighth of a revolution. Consequently, there is an idle position, 91ᵇ, between the bolt receiving position, 91ª, and the nutting position, 91ᶜ. This is not necessary, but it is convenient for various reason, as, for instance, it permits the guides, 40 and 120, to be spaced apart and parallel instead of crossing, while at the same time the indexing distance and velocities are only one-half what they would be if each step was a quadrant instead of one-eighth of a circle.

While I have described the machine as if the table, 1, were horizontal and shafts, 14, 24 and 6, vertical, this is by no means necessary and, as a matter of fact, for convenience of hopper supply, the machine as actually built and operated has an inclination which brings the table 30° and the operating shaft 60° from horizontal.

This arrangement is shown in Fig. 6, where all parts are substantially the same as in Figs. 1 to 5, except that the bolt guides, 120ˣ, leading from the bolt hopper (not shown), may be approximately parallel with the table, 1, the thirty degree angle of the latter being quite sufficient for gravity feed of the bolts. In either case, the bolt guides are preferably adjusted by and with the bolt hopper and carry with them the bolt turret, 91, which rests upon bearing, 110. In this figure the principal adjustment, instead of being in a standard, 112, on the table, 1, is through a slide, 111ˣ, in guides, 112ˣ, on the rear support frame, 3ˣ. The slide may be adjustably held by screw, 3ʸ, having collar, 3ᶻ, engaging ear, 112ᶻ, on the frame of the machine.

Having the table support, 1, inclined at a substantial angle as described above is preferred for various reasons. The peripheral bearings all become supporting bearings carrying part of the weight of the rotating parts, thus partly relieving the thrust bearings, minimizing wobbling in case of slight looseness or clearance in the lateral bearing and simplifying problems of lubrication.

If any nuts or bolts become displaced, they automatically slide off the table and away from the operating parts. The bolt guideway can come in at a minimum angle on a straight line in the same plane with the bolt carrier, 91, thus ensuring proper feed of the bolts with much less tendency for the heads to become clogged in the guides than with the curved approach shown in Fig. 3.

I claim:

1. A nutting machine for bolts, etc., including a rotor having a socket substantially larger than the nut and means continuously rotating the same about the axis of the socket said socket being sufficiently larger than said nut to permit insertion of said nut while said socket is rotating at high speed, in combination with bolt positioning means permitting axially aligned engagement of the bolt thread and the nut thread.

2. A nutting machine for bolts, etc., including a rotor having a socket substantially larger than the nut and means continuously rotating the same at high speed about the axis of the socket, in combination with a bolt holding carrier, means for indexing it about an axis parallel with the axis of the rotor to present successive bolts in alignment with the rotor, said rotor being axially movable into operative relation for engaging a nut in the socket with the end of a bolt in the carrier and means for withdrawing the rotor to initial position to permit indexing of the bolt carrier.

3. A nutting machine for bolts, etc., including an endwise movable spindle having an axial socket substantially larger than the nut and means for continuously rotating the spindle at high speed about its axis, in combination with a bolt holding carrier, means for indexing it to present successive bolts in alignment with the socket and means for non-positively forcing the spindle axially into operative relation for engaging a nut in the socket with the end of a bolt in the carrier and means for withdrawing the spindle to initial position to permit indexing of the bolt carrier.

4. A nutting machine for bolts, etc., including a rotor having an axial socket substantially larger than the nut and means for continuously rotating the same, in combination with a rotary bolt holder having its axis parallel with the axis of the rotor socket to present successive bolts in alignment with the socket and means permitting relative axial movement of socket and bolt holder for engaging a nut in the socket and the end of a bolt in the carrier.

5. A nutting machine for bolts, etc., including a rotor having an axial socket substantially larger than the nut and means for continuously rotating the same, in combination with a rotary bolt holder having its axis parallel with the axis of the rotor socket to present successive bolts in alignment with the socket and means permitting relative axial movement of socket and bolt holder for engaging a nut in the socket and the end of a bolt in the carrier, and means for withdrawal of said rotor to initial position to permit indexing of the bolt carrier, together with laterally reciprocating placer means moving nuts, one at a time, over the continuously rotating socket and for yieldingly pressing them therein.

6. A nutting machine for bolts, etc., including a rotary shaft having an axial socket substantially larger than the nut and means for continuously rotating the same, in combination with a rotary bolt carrier having its axis parallel with the axis of the rotating socket and having peripheral spaced-apart bolt holders to present successive bolts in alignment with the socket, means for indexing the carrier, means for non-positively forcing the socket axially to engage a nut therein with the end of a bolt in the carrier while in an indexed position and means for withdrawing the socket to initial position to permit indexing of the bolt carrier, together with laterally reciprocating placer means non-positively moving nuts, one at a time, over the socket and non-positively pressing them into the socket while in initial retracted position and during indexing movements of the carrier.

7. A nutting machine for bolts, etc., including a rotor having an axial socket substantially larger than the nut and means for continuously rotating the same, in combination with a rotary bolt carrier, means for indexing it about an axis parallel with the axis of the socket to present successive bolts in alignment with the socket and means for forcing the socket axially into operative relation for engaging a nut therein with the end of a bolt in the carrier and means for withdrawing the rotor to initial position while the bolt carrier is being indexed.

8. A nutting machine for bolts, etc., including a rotary shaft having an upwardly presented axial socket, and means for continuously rotating the shaft and socket and for reciprocating said shaft and socket at intervals, in combination with a bolt holder for axially aligned presentation of a bolt for engagement by a nut in the socket, the shaft and socket being spring urged toward the bolt holder and the retraction at intervals being by positively acting camming mechanism.

9. A nutting machine for bolts, etc., including a rotary shaft having an upwardly presented axial socket, and means for continuously rotating the shaft and socket and for reciprocating said shaft and socket at intervals, in combination with a bolt holder for axially aligned presentation of a bolt for engagement by a nut in the socket, the shaft and socket being spring urged toward the bolt holder and the retraction at intervals being by positively acting camming mechanism, together with a laterally reciprocating placer for moving nuts, one at a time, onto the socket and pressing them therein.

10. A nutting machine for bolts, etc., including a rotary shaft having an upwardly presented axial socket, and means for continuously rotating the shaft and for reciprocating it at intervals, in combination with a bolt holder for axially aligned presentation of a bolt for engagement by a nut in the socket, the shaft being spring urged toward the bolt holder and the retraction at intervals being by positively acting camming mechanism, together with a laterally reciprocating placer for moving nuts, one at a time, onto the socket and pressing them therein, the placer being spring actuated toward the rotary socket shaft and positively retracted.

11. A nutting machine for bolts, etc., including a rotary shaft having an upwardly presented axial socket larger than the nut and means for continuously rotating the shaft at high speed about said axis, in combination with a laterally reciprocating placer for moving nuts, one at a time, over the socket and yieldingly pressing them, therein; a bolt holding carrier, means for indexing it about an axis parallel with the axis of the shaft to present successive bolts in alignment with the socket and means for forcing the rotating socket shaft axially to engage a nut in the socket with the end of a bolt in the carrier and means for withdrawing the chuck to initial position to permit indexing of the bolt carrier.

12. A machine for operating on the shanks of bolts and the like, including a rotary carrier provided with means for holding bolts equidistant from and parallel with the axis of the carrier, a shaft and means supporting and rotating it on an axis parallel with the axis of the bolt carrier and having nut engaging means on the end thereof, in alignment with the axes of successive bolts on the carrier, in combination with power driven timing mechanism for indexing movement of the bolt holder and endwise reciprocation of the rotary shaft to and from an indexed position for the successive bolts.

13. A machine for operating on the shanks of bolts and the like, including a rotary carrier provided with means for holding bolts equidistant from and parallel with the axis of the carrier, a shaft and means supporting and rotating it on an axis parallel with the axis of the bolt carrier and having nut engaging means on the end thereof, in alignment with the axes of successive bolts on the carrier, in combination with power driven timing mechanism for indexing movement of the bolt holder and endwise reciprocation of the rotary shaft to and from an indexed position for the successive bolts, said mechanism including a spring for forcing the shaft toward the bolt and positive means for retracting it during indexing movements of the carrier.

14. A machine for operating on the shanks of bolts and the like, including a rotary carrier provided with means for holding bolts equidistant from and parallel with the axis of the carrier, a shaft and means supporting and rotating it on an axis parallel with the axis of the bolt carrier and having nut engaging means on the end thereof, in alignment with the axes of successive bolts on the carrier, in combination with power driven timing mechanism for indexing movement of the bolt holder and endwise reciprocation of the rotary shaft to and from an indexed position for the successive bolts, said mechanism including a spring for forcing the shaft toward the bolt and positive means for retracting it during indexing movements of the carrier, and a Geneva stop for rotating the bolt carrier.

15. A machine for operating on the shanks of bolts and the like, including a rotary carrier provided with means for holding bolts equidistant from and parallel with the axis of the carrier, a shaft and means supporting and rotating it on an axis parallel with the axis of the bolt carrier and having nut engaging means on the end thereof, in alignment with the axes of successive bolts on the carrier, in combination with power driven timing mechanism for indexing movement of the bolt holder and endwise reciprocation of the rotary shaft to and from an indexed position for the successive bolts, said mechanism including a Geneva stop for rotating the bolt carrier.

16. A machine for operating on the shanks of bolts and the like, including a rotary carrier provided with means for holding bolts equidistant from and parallel with the axis of the carrer, a shaft and means supporting and rotating it on an axis parallel with the axis of the bolt carrier and having nut engaging means on the end thereof, in alignment with the axes of successive bolts on the carrier, in combination with power driven timing mechanism for indexing movement of the bolt holder and endwise reciprocation of the rotary shaft to and from an indexed position for the successive bolts, said mechanism including a Geneva stop for rotating the bolt carrier and a slip coupling between the Geneva stop and the bolt carrier.

17. A machine for operating on the shanks of bolts and the like, including a rotary carrier provided with means for holding bolts equidistant from and parallel with the axis of the carrier, a shaft and means supporting and rotating it on an axis parallel with the axis of the bolt carrier and having nut engaging means on the end thereof, in alignment with the axes of successive bolts on the carrier, in combination with power driven timing mechanism for indexing movement of the bolt holder and endwise reciprocation of the rotary shaft to and from an indexed position for the successive bolts, said mechanism including a Geneva stop driving the bolt carrier through a slip coupling and a reducing gear.

18. A spindle having a nut holding socket in the end thereof, and having means for continuously rotating it and for projecting it at intervals into engagement with a bolt, in combination with a laterally reciprocating placer means adapted to move nuts, one at a time, over the socket, the means for reciprocating the placer including a spring urging the placer against the spindle while in the projected position and means for positively retracting the same against the spring at intervals to permit projecting movements of the spindle.

19. A spindle having a nut holding socket in the end thereof, and having means for continuously rotating it and for projecting it at intervals into engagement with a bolt, in combination with a laterally reciprocating placer means adapted to move nuts, one at a time, over the socket, the means for reciprocating the placer including a spring urging the placer against the spindle while in the projected position and means for positively retracting the same against the spring at intervals to permit projecting movements of the spindle, said placer carrying a presser foot adapted to bear on the upper face of the nut and force it into the rotating socket when the latter is in the retracted position.

20. A spindle having a nut holding socket in the end thereof, and having means for continuously rotating it and for projecting it at intervals into engagement with a bolt, in combination with a laterally reciprocating placer means adapted to move nuts, one at a time, over the socket, the means for reciprocating the placer including a spring urging the placer against the spindle while in the projected position and means for positively retracting the same against the spring at intervals to permit projecting movements of the spindle, said placer carrying a presser foot adapted to bear on the upper face of the nut and force it into the rotating socket when the latter is in the retracted position, together with a presser foot retractor including a stationary camming element engaged by a cooperating member on the placer when the latter is retracted.

21. A machine for operating on bolts and the like, including a shaft, a bolt carrying disc mounted on the upper end of the shaft, a sleeve in which said shaft is longitudinally movable and to which it is splined and means for indexing said sleeve, together with means for endwise support of said shaft in any desired position of adjustment, in combination with another shaft carrying a cooperating rotary device on the end thereof, said shaft being parallel with the bolt carrier shaft and splined in a sleeve having means for continuously rotating it; together with means for intermittently reciprocating said shaft to and from a bolt while in an indexed position.

22. A machine for operating on bolts and the like, including a shaft, a bolt carrying disc mounted on the upper end of the shaft having peripheral bolt engaging notches, a bolt supplying guide in operative relation to said notches, a sleeve in which said shaft is longitudinally movable and to which it is splined, means for indexing said sleeve, together with means for endwise support of said shaft and the cooperating end of said guide, in any desired position of endwise adjustment, in combination with another shaft carrying a cooperating rotary device on the end thereof, said shaft being parallel with the bolt carrier shaft and splined in a sleeve having means for continuously rotating it; together with means for intermittently reciprocating said shaft to and from a bolt while in an indexed position.

23. A rotary bolt carrier having a plurality of equally spaced bolt holding notches, and means for indexing the carrier to bring the notches successively in registry with bolt supplying guides and in registry with means for performing an operation on the ends of the bolts, said carrier being mounted on a rotary telescoping shaft to which the indexing movements are imparted by suitable mechanism; in combination with means for holding the carrier and shaft in fixed relation and for adjusting said holding means parallel with the axis of said shaft.

24. A rotary bolt carrier having a plurality of equally spaced bolt holding notches, and means for indexing the carrier to bring the notches successively in registry with bolt supplying guides and in registry with means for performing an operation on the ends of the bolts, said carrier being mounted on a rotary telescoping shaft to which the indexing movements are imparted by suitable mechanism, in combination with means for holding the carrier and shaft in fixed relation and means for adjusting said holding means parallel with the axis of said shaft, said carrier being freely rotatable upon said shaft but adjustably held in fixed angular relation thereto by screw means engaging a member keyed to said shaft.

25. A rotary bolt carrier having a plurality of equally spaced bolt holding notches, and means for indexing the carrier to bring the notches successively in registry with bolt supplying guides and in registry with means for performing an operation on the ends of the bolts, said carrier being mounted on a rotary shaft to which the indexing movements are imparted by suitable mechanism, said carrier being freely rotatable upon said shaft but adjustably held in fixed relation thereto by screw means engaging a member keyed to said shaft, and said shaft being itself axially adjustable in a sleeve to which it is keyed and through which the indexing movements are imparted.

26. A rotary bolt carrier having a plurality of equally spaced bolt holding notches, and means for indexing the carrier to bring the notches successively in registry with bolt supplying guides and in registry with means for performing an operation on the ends of the bolts, said carrier being mounted on a rotary shaft to which the indexing movements are imparted by suitable mechanism, said carrier being freely rotatable upon said shaft but adjustably held in fixed relation thereto by screw means engaging a member keyed to said shaft, and said shaft being itself axially adjustable in a sleeve to which it is keyed and through which the indexing movements are imparted; in combination with means for holding the carrier and guides in fixed relation and for adjusting said holding means parallel with the axis of said shaft.

27. A rotary bolt carrier having a plurality of equally spaced bolt holding notches, and means for indexing the carrier to bring the notches successively in registry with bolt supplying guides and in registry with means for performing an operation on the ends of the bolts, said carrier being mounted on a rotary shaft to which the indexing movements are imparted by suitable mechanism, and said shaft being itself axially adjustable in a sleeve to which it is keyed and through which the indexing movements are imparted; in combination with means for holding the carrier and guides in fixed relation for adjusting said holding means parallel with the axis of said shaft.

28. A machine for nutting bolts, including a rotary nut chuck, a rotary bolt carrier, means for indexing the carrier into operative relation with said chuck and, beyond the nutting position, guide means adapted to strip bolts from the carrier and support them by their heads, said guides being arranged to invert the bolts, permitting those that are not nutted to drop out while retaining the nutted bolts by their nuts.

29. A machine for automatically separating nutted from unnutted bolts, including guide means adapted to support them by their heads, said guides being twisted so as to invert the bolts, permitting those that are not nutted to drop out while retaining the nutted bolts by their nuts and guiding them to another region.

30. A machine for screwing nuts on bolts, in combination with exit guide means supporting the bolt by the nut screwed thereon, whereby bolts that are not nutted drop out while the nutted bolts are guided to another region.

Signed at North Tonawanda, in the county of Niagara, and State of New York, this 4th day of February, A. D. 1926.

EDWARD A. MOLLNOW.